United States Patent [19]

Nungesser

[11] Patent Number: 5,380,438
[45] Date of Patent: Jan. 10, 1995

[54] TREATMENT OF WASTEWATER THROUGH ENHANCED BIOLOGICAL PHOSPHORUS REMOVAL

[75] Inventor: Philip W. Nungesser, Atlanta, Ga.

[73] Assignee: City of Atlanta, Atlanta, Ga.

[21] Appl. No.: 108,117

[22] Filed: Aug. 17, 1993

[51] Int. Cl.⁶ .................................. C02F 3/30
[52] U.S. Cl. ................................ 210/605; 210/607; 210/624; 210/630; 210/903; 210/906
[58] Field of Search ............ 210/605, 607, 610, 611, 210/623, 624, 626, 630, 631, 903, 906

[56] References Cited

U.S. PATENT DOCUMENTS

| | | | |
|---|---|---|---|
| 3,864,246 | 2/1975 | Casey et al. | 210/605 |
| 4,056,465 | 11/1977 | Spector | 210/605 |
| 4,162,153 | 7/1979 | Spector | 210/605 |
| 4,257,897 | 3/1981 | Krichten et al. | 210/605 |
| 4,271,026 | 6/1981 | Chen et al. | 210/605 |
| 4,488,967 | 12/1984 | Block et al. | 210/605 |
| 4,488,968 | 12/1984 | Hong et al. | 210/605 |
| 4,522,722 | 6/1985 | Nicholas | 210/605 |
| 4,874,519 | 10/1989 | Williamson | 210/605 |
| 4,948,510 | 8/1990 | Todd et al. | 210/605 |
| 5,076,928 | 12/1991 | Ballnus | 210/906 |
| 5,242,592 | 9/1993 | Ballnus | 210/906 |

OTHER PUBLICATIONS

William C. Boyle, *Summary of Patented and Public Biological Phosphorus Removal Systems*, Aug., 1991.

*Primary Examiner*—Thomas Wyse
*Attorney, Agent, or Firm*—Michael Drew

[57] ABSTRACT

Wastewater is treated by promoting the presence and growth of BPR organisms, which have the ability to absorb and retain an amount of phosphorus in excess of the amount required by the BPR organisms for metabolism and cell growth. In the process, a mixture of influent wastewater (10) and activated sludge (14) containing BPR organisms is first subjected to a period of incubation in an anoxic zone (20) followed by a period of incubation in an anaerobic zone (30). Volatile fatty acids (VFA's) (16) are added in the anaerobic zone (30). The mixture is then subjected to an aerobic zone (41). The wastewater mixture (46) leaving the aerobic zone is clarified in a clarifier (50), causing activated sludge to settle. The activated sludge contains BPR organisms which are engorged with phosphorus absorbed from the wastewater. The clarified wastewater (52) becomes effluent from the system. The activated sludge (54) is removed from the clarifier (50). A portion of the activated sludge, which contains some of the phosphorus-rich BPR organisms is wasted (56). The remainder of activated sludge (14) is returned to the system and mixed with influent wastewater (10) in the anoxic zone (20).

3 Claims, 1 Drawing Sheet

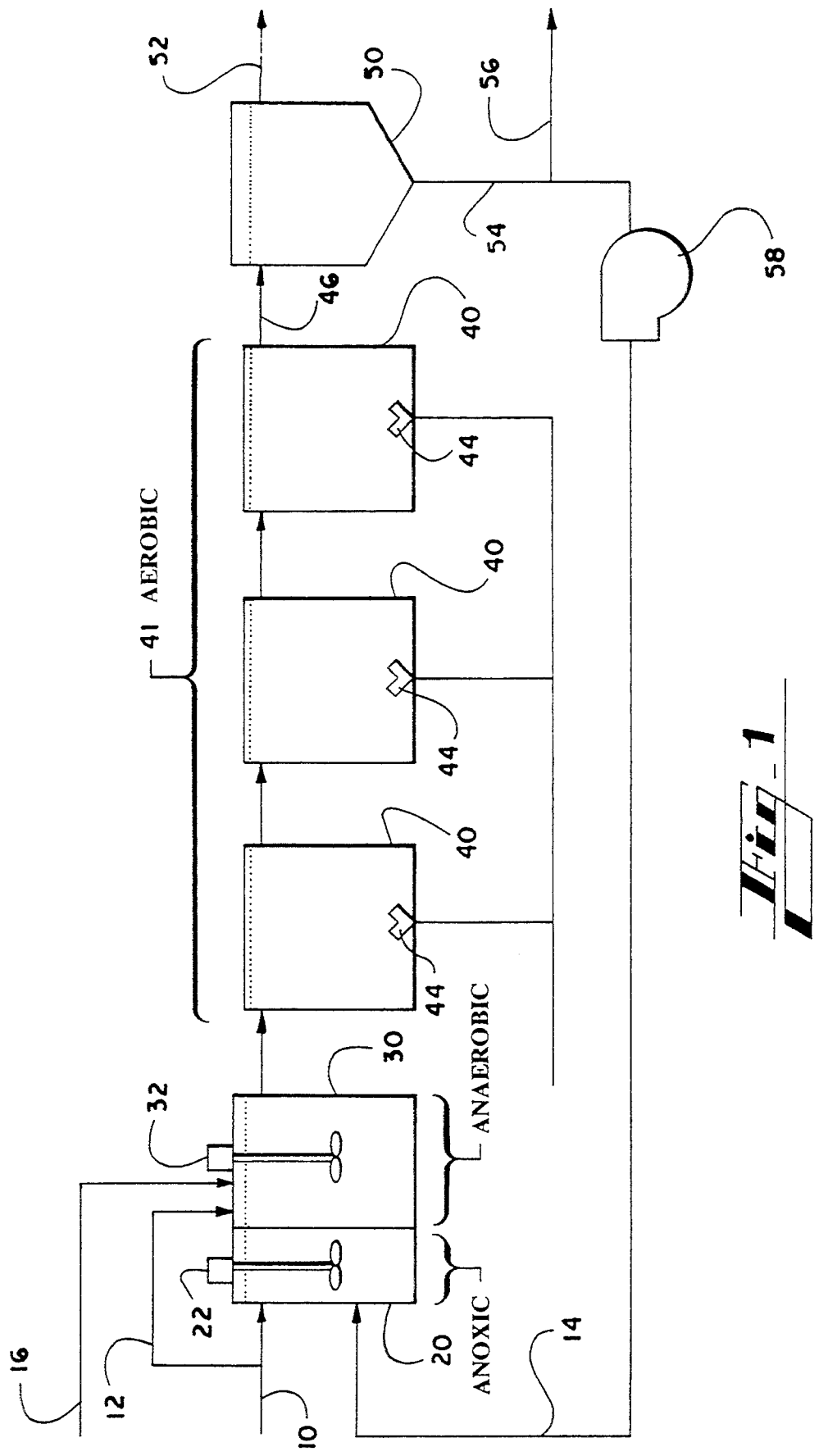
Fig_1

TREATMENT OF WASTEWATER THROUGH ENHANCED BIOLOGICAL PHOSPHORUS REMOVAL

TECHNICAL FIELD OF THE INVENTION

The present invention relates to methods and processes for biologically treating wastewater for the removal of biochemical oxygen demand (BOD), ammonia and phosphorus, and more particularly to a volatile-fatty-acid induced phosphorus removal method for biologically treating wastewater.

BACKGROUND OF THE INVENTION

A very important step in the treatment of sewage by a wastewater treatment facility is to reduce undesirable levels of phosphorus from effluent wastewater before the effluent is passed on to a stream, lake, river or other terminal body of water. Wastewater treatment facilities often use biological treatment methods to remove undesirable substances such as BOD, ammonia and phosphorus, from wastewater. Biological treatment of the wastewater allows and encourages one or more types of bacteria normally present in wastewater to act upon the undesirable substances resulting in removal of these substances from effluent wastewater. So-called "enhanced biological phosphorus removal" (EBPR) is a biological method for reducing levels of phosphorus from wastewater. EBPR utilizes a biomass of microorganisms (bacteria) which can characteristically absorb large amounts of phosphorus from their environment during metabolic processes. For convenience, these microorganisms may be referred to as "Biological Phosphorous Removal Organisms" or "BPR organisms."

Some wastewater treatment facilities remove ammonia through a biological nitrification process that oxidizes ammonia. A problem with present EBPR methods in systems that also oxidize ammonia through the biological process of nitrification, is that the efficacy of the process is inhibited by the presence of compounds resulting from the ammonia oxidation, and in particular, nitrate and nitrite compounds ($NO_x$—N). $NO_x$—N compounds can prevent the selective growth of BPR organisms to the level needed for efficient phosphorus removal. $NO_x$—N compounds are commonly found in nitrifying activated sludge treatment systems because ammonia, which is commonly found in wastewater, is nitrified during aerobic phases of wastewater treatment into $NO_x$—N compounds. Thus, it is necessary to have an EBPR process for reducing the amount of phosphorus in wastewater which process includes a method for reducing the amount of $NO_x$—N compounds returned in the activated sludge of wastewater treatment systems during treatment. Processes are known which use large internal recycle(s) of a treated mixture prior to clarification and large tankage (above the normal tankage requirements of a system) to achieve $NO_x$—N reduction. However, the use of large internal recycle(s) and large tankage requires a modification of existing systems that greatly increases the capital cost and cost of operating a treatment system. Thus, it can be appreciated that it would be desirable to have an EBPR process which can achieve $NO_x$—N reduction without the use of costly recycle(s) and increased tankage.

SUMMARY OF THE INVENTION

It is an object of the invention to provide an enhanced biological phosphorus and ammonia removal treatment process for treating wastewater which is made more efficient by reducing the amount of $NO_x$—N compounds in the return activated sludge (RAS) of wastewater treatment systems and by the addition of supplemental volatile fatty acids (VFA'S).

It is a further object of the invention to provide an enhanced biological phosphorus removal treatment process that reduces the amount of $NO_x$—N compounds in nitrifying activated sludge of wastewater systems which process may be utilized with existing wastewater treatment facilities at a minimal cost.

In the present invention, wastewater is treated by promoting the presence and growth of certain microorganisms, that is, the BPR organisms, which have the ability to absorb and retain an amount of phosphorus in excess of the amount required by the BPR organisms for metabolism and cell growth. In the process, a mixture of influent wastewater and activated sludge containing BPR organisms is first subjected to a period of incubation in an anoxic environment (anoxic zone) followed by a period of incubation in an anaerobic environment (anaerobic zone). Volatile fatty acids (VFA's) are added in the anaerobic zone. The wastewater is then subjected to an aerobic zone of any one of several configurations. The wastewater mixture leaving the aerobic zone is clarified, causing activated sludge to settle. The activated sludge contains BPR organisms which are engorged with phosphorus absorbed from the wastewater. The clarified wastewater becomes effluent from the system. A portion of the activated sludge, which contains some of the phosphorus-rich BPR organisms is wasted. The remainder of activated sludge is returned to the system and mixed with influent wastewater in the anoxic zone.

Other aspects, objects, features, and advantages of the present invention will become apparent to those skilled in the art upon reading the detailed description of preferred embodiments.

BRIEF DESCRIPTION OF THE DRAWING

FIGURE 1 is a schematic representation of an enhanced biological phosphorus removal process of a preferred embodiment of the invention.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawing. The drawing is a schematic diagram illustrating the preferred embodiment of the invention.

First, some of the terms used herein will be defined as they pertain to wastewater treatment to aid in an understanding of the description of the preferred embodiment. "Wastewater" generally refers to waters containing contaminants from domestic and industrial sources. "Influent wastewater," or "influent," is the wastewater which is subjected to the process described herein. "Effluent wastewater," or "effluent," is the wastewater which exits the treatment system for delivery to a terminal body of water or additional treatment facility. "Sludge" or "activated sludge" is the mass of organic material consisting predominantly of microorganisms which are separated from the treated wastewater by clarification.

As a general overview, the preferred embodiment of the invention is an enhanced biological phosphorus removal process which promotes a favorable environment for the proliferation of certain microorganisms (BPR organisms) which have the ability to absorb and retain an amount of phosphorus in excess of the amount required by the BPR organisms for metabolism and cell growth. For convenience, these microorganisms are referred to herein as BPR organisms. An example of such microorganisms is acinetobacter. The preferred embodiment of the invention described herein improves enhanced biological phosphorus removal by providing an anoxic zone wastewater treatment area followed by an anaerobic zone wastewater treatment area, and adding volatile fatty acids (VFA's) as an additional food source for the BPR organisms into the anaerobic zone. It has been demonstrated that VFA's (acetic and propionic acids in particular) are the preferred substrate to select for and optimize proliferation of BPR organisms. EBPR is improved because the combination of an anoxic zone preceding an anaerobic zone together with the addition of VFA's in the anaerobic zone creates an environment which promotes the proliferation of BPR organisms in general and with respect to other microorganisms.

Referring to FIGURE 1, therein is illustrated a schematic representation of an enhanced BPR process according to a preferred embodiment of the invention. Anoxic and anaerobic zones are represented by cells 20 and 30, respectively. A series of cells 40 represent a plug-flow aerobic zone 41. Influent 10 is fed into an anoxic zone 20 together with activated sludge 14 which is returned from the end stage of the process. In wastewater treatment, "anoxic" generally refers to a condition in which little or no dissolved oxygen (DO) is present in the wastewater chamber, however, $NO_x$—N compounds are present. "Anaerobic" refers to the condition in which oxygen and $NO_x$—N concentrations are very low (DO<0.7 mg/l; $NO_x$—N<0.3 mg/l). To create and maintain an anoxic or anaerobic zone, air, a primary source of oxygen, is prevented from being introduced into the treatment chamber. In FIGURE 1, a mixer(s) 22 aids commingling of the admixture of influent and activated sludge returned from the terminal point of the system, but does not agitate the admixture so as to cause aeration which would introduce oxygen into the chamber. BPR organisms which are key to the EBPR process are contained in the activated sludge. The activated sludge 14 which is fed into the process at the first cell 20 may also be referred to as "return activated sludge" (RAS) because it is activated sludge that is removed from the terminal point of the process and "returned" to the beginning of the process cycle. The process system is designed to cause an increase in the population of BPR organisms as the activated sludge is recycled through the system. The BPR organisms are used to remove phosphorus from wastewater by being allowed to absorb phosphorus from their environment (that is, the surrounding wastewater in a chamber). The so-called BPR organisms are characteristically able to absorb a greater amount of phosphorus than is necessary for cell growth, metabolism and reproduction. However, also characteristically, oxidized compounds inhibit the growth and proliferation of the BPR organisms. Oxidized compounds present in wastewater and return activated sludge are typically $NO_x$—N compounds. The preferred embodiment removes $NO_x$—N from the wastewater environment by employment of an anoxic zone in which $NO_x$—N is reduced to nitrogen gas. The nitrogen gas is allowed to escape from the cell 20. $NO_x$—N is reduced to gaseous nitrogen in the anoxic zone cell 20 by allowing microorganisms to take on nutrition from the substrate of the wastewater mixture in the absence of oxygen but in the presence of the $NO_x$—N compounds, which are present. In wastewater treatment, the substrate is generally considered to be the substance which serves as the food source for microorganisms in the wastewater. An essential part of the substrate is organic matter measured in terms of and referred to by the term "biochemical oxygen demand" (BOD). Bacteria generally use oxygen to help metabolize food sources. When microorganisms (which may or may not be BPR organisms) which are commonly present in wastewater attempt to consume and metabolize BOD as a food source in the absence of oxygen, $NO_x$—N compounds in the wastewater are used instead of oxygen to help metabolize the BOD. These microorganisms may be generally referred to as "denitrifying organisms" because they use $NO_x$—N as final electron acceptors during metabolic processes, converting the $NO_x$—N into nitrogen gas. The nitrogen gas is allowed to escape from the chamber 20. Thus, the $NO_x$—N content of wastewater is substantially reduced in the anoxic zone, enhancing conditions for the selective growth of BPR organisms in following chambers.

The wastewater mixture travels from the anoxic zone 20 (very low oxygen but containing $NO_x$—N) into the anaerobic zone 30 (very low oxygen and $NO_x$—N which were reduced to nitrogen gas in the anoxic zone 20). A significant characteristic of BPR organisms is that they have the ability to take up and store food sources in the absence of oxygen and $NO_x$—N whereas the other microorganisms commonly present in activated sludge can only take up food in the presence of oxygen or $NO_x$—N. The environment in the anaerobic zone 30 thus gives the BPR organisms a competitive advantage over other microorganisms present in the anaerobic zone 30. In addition, since VFA's (a food source for the microorganisms), or a portion of influent containing VFA's, is fed directly to the anaerobic zone, the BPR organisms are able to take up and store a greater proportion of food than they would otherwise be able to take up and store in the absence of the conditions created in the anaerobic zone 30. Referring again to FIGURE 1, the $NO_x$—N-reduced wastewater from the anoxic zone 20 may optionally be mixed with additional influent from an influent branch line 12 fed into the anaerobic zone chamber 30 and/or volatile fatty acids (VFA's) from a VFA line 16 fed into the anaerobic zone chamber 30. A mixer(s) 32 promotes commingling of the three. In this configuration, influent wastewater from the branch influent line 12 brings in not only additional wastewater to be treated but along with it may also bring additional VFA's as a food source for the BPR organisms which am selectively fed in the anaerobic zone 30. VFA's introduced through the VFA line 16 are added to the wastewater in the anaerobic zone 30 as an additional food source for the BPR organisms because much of the readily biodegradable food sources available in the system may have been consumed during denitrification in the anoxic zone 20. Suitable sources of VFA's are acetate and acetic acid, which are commercially available or which can be produced through the fermentation of primary sludge. The BPR organisms are characteristically capable of consuming VFA's under anaerobic conditions while competing microorganisms cannot. VFA's are the preferable substrate to optimize BPR. Therefore, in the anaerobic zone 30, the BPR organisms are selectively fed because of the infusion of a food source (VFA's) compatible with their growth and the absence of $NO_x$—N and oxygen which would allow other microorganism to compete. The anaerobic zone 30 allows biochemical processes of the BPR organisms to take place in the absence of oxygen or $NO_x$—N. In this environment, the BPR organisms consume the BOD and VFA food sources. BPR organisms characteristically store energy under aerobic conditions in the form of polyphosphate within their cells. This stored polyphosphate is used as an energy source under anaerobic conditions to enable BPR organisms to take up food sources, and particularly VFA's as a food source. The VFA's which are taken up are stored as polyhydroxybutyrate (PHB). When BPR organisms take up VFA's as a food source, large quantities of phosphorus, in the form of ortho-phosphate, are released into the surrounding wastewater. BPR organisms cannot use the stored PHB to grow and reproduce without oxygen. Since there is no oxygen in the anaerobic zone, the stored PHB is not utilized to grow and reproduce until the mixture containing the BPR organisms is exposed to oxygen in the aerobic zone 41. When the BPR organisms leave the anaerobic zone 30, they are primed to not only re-absorb the released phosphorus in the form of ortho-phosphate but, further, are ready to absorb additional quantities of phosphorus in the next stage of the EBPR process resulting in low levels of phosphorus in the effluent 52.

The aerobic zone 41 treatment chamber illustrated in the process of the preferred embodiment discussed herein is of plug flow configuration. The plug flow aerobic chamber is schematically illustrated as a series of cells 40. An air line 42 supplies air to aerators 44 that aerate wastewater in the aerobic zone 41. Mechanical aerators or pure oxygen could be used in place of the diffused aerators to provide aerobic conditions. By the time the BPR organisms arrive in the aerobic zone 41 they have been subjected to environmental conditions favorable to their uptake of food sources. The result is that there is a robust BPR organism population which enters the aerobic zone 41 ready to grow and reproduce upon exposure to oxygen.

Phosphorus compounds are essential constituents of life forms, including BPR organisms. Most phosphorus found in wastewater exists in the form of phosphates, and, in particular, in the form of ortho-phosphates. The BPR organisms which enter the aerobic zone 41 are able to, and do, utilize the ortho-phosphates present in the wastewater in their metabolic processes. The ortho-phosphates present in the aerobic zone 41 are those released by the BPR organisms during the take up and storage of substrate in the anaerobic zone 30 and the phosphorus already present in influent wastewater 10 (in the form of orthophosphates). In the aerobic zone 41, the PHB which has been stored by the BPR organisms is used for growth and reproduction. As growth and reproduction occur, the BPR organisms characteristically take up large amounts of phosphorus, that is, ortho-phosphates. Thus, the BPR organisms easily take up not only the ortho-phosphates released in the anaerobic zone 30 but also the ortho-phosphates originally present in the influent wastewater 10. The BPR organisms store ortho-phosphate as polyphosphate. The polyphosphate will in turn be used as an energy source for the uptake of the VFA food source in the anaerobic zone when the BPR organisms are recycled through the system.

As discussed above, the aerobic zone 41 treatment chamber illustrated is of plug flow configuration. However, other aeration and/or oxygenation configurations are also suitable, such as so-called step-feed and complete-mix aeration configurations and oxygen activated sludge systems.

Wastewater containing phosphorus-laden BPR organisms is removed from the aerobic zone 41 through a line 52 to a clarifier 50. The clarifier 50 separates what will be the effluent from activate sludge. Activated sludge settles in the clarifier 50. A line carries effluent from the clarifier 50 to either a terminal body of water or other processing units. The activated sludge collected in the bottom of the clarifier 50 is a sludge which contains phosphorus-laden BPR organisms. The sludge is referred to as activated sludge because it is predominately comprised of microorganisms. A sludge evacuation line 54 carries activated sludge from the clarifier 50. A waste sludge line 56 directs a selected quantity of activated sludge from the sludge evacuation line 54 to be removed from the system. A sludge pump, or other hydraulic device, 58 directs activated sludge through the return activated sludge line 14. The enhanced BPR process continues and is ongoing from the anoxic zone 20.

The enhanced BPR process described herein is easily employed by adding a suitably sized anoxic zone 20 with mixer(s) 22 and a suitably sized anaerobic zone 30 with mixer(s) 32 to an aerobic wastewater treatment system. Conventional conduits and metering devices may be used for the influent line 10, branch influent line 12, and RAS line 14. Existing basins, pumps and other capital equipment in a wastewater treatment facility may be used to perform the process described herein. The amount of VFA's used, and the time of holding mixtures at each stage depends upon the amount of phosphorus desired to be removed, the characteristics of the wastewater and time needed for ammonia and BOD removal.

The following are example process parameters and the results of three months of testing of the invention showing typical performance of the process in a plug flow configuration. The parameters would be different for different wastewater strength and treatment requirements.

| Flow rate: | 23,000 gallons per day |
| --- | --- |
| Hydraulic residence time for each chamber (Q basis) | |
| Anoxic chamber | 0.75 hours |
| Anaerobic chamber | 0.75 hours |
| Aerobic chamber | 4.50 hours |
| Total residence time | 6.00 hours |

| Average values during three month test phase: | | | |
| --- | --- | --- | --- |
| Parameter Concentration | Influent Concentration mg/l | Effluent Efficiency mg/l | Removal percent |
| sBOD | 53.88 | 1.50 | 97 |
| TSS | 76.84 | 4.45 | 94 |
| TKN | 19.99 | 1.05 | 95 |
| NH$_3$ | 13.33 | 0.16 | 99 |
| Tot. Phos. | 3.48 | 0.24 | 93 |
| Sol. Phos. | 2.17 | 0.12 | 94 |
| Ortho. Phos. | 2.74 | 0.11 | 96 |

-continued

VFA addition 10 mg/l as HAc (Q basis)

Description of some Abbreviations and Terms not previously described
sBOB-Soluble BOD
TSS-Total Suspended Solids
TKN-Total Kjeldahl Nitrogen (combination of organic nitrogen and ammonia, precursor to ammonia)
Sol. Phos.-Soluble Phosphorus
HAc-Acetic Acid
Q-Measurement Reflecting Flow Rate As should be apparent from the foregoing specification, the invention is susceptible to being modified with various alterations and modifications which may differ from those which have been described in the preceding specification and description. Accordingly, the following claims are intended to cover all alterations and modifications which do not depart from the spirit and scope of the invention.

What is claimed is:

1. A process for treating wastewater for the removal of BOD, ammonia and phosphorus with activated biomass which utilizes phosphorus compounds during metabolism comprising:

first, subjecting influent wastewater to an anoxic zone wherein influent wastewater is mixed with activated sludge biomass containing microorganisms which utilize phosphorus compounds during metabolism;

next, subjecting said mixture of influent wastewater and activated sludge biomass to an anaerobic zone wherein said mixture of influent wastewater and activated sludge biomass is further mixed with volatile fatty acids to form a liquor;

next, aerating said liquor in an aerobic zone; and clarifying said aerated liquor to separate activated sludge biomass from effluent wastewater.

2. The process of claim 1, wherein the step of subjecting said mixture of influent wastewater and activated sludge biomass to an anaerobic zone further comprises mixing additional influent wastewater with said mixture of influent wastewater and activated sludge biomass.

3. The process of claim 1, further comprising the step of providing a portion of said activated sludge biomass which has been separated from said liquor as said activated sludge biomass containing microorganisms which utilize phosphorus compounds during metabolism in said step of subjecting influent wastewater to an anoxic zone wherein influent wastewater is mixed with activated sludge biomass containing microorganisms which utilize phosphorus compounds during metabolism.

* * * * *